(12) United States Patent
Gardner et al.

(10) Patent No.: US 7,966,331 B2
(45) Date of Patent: Jun. 21, 2011

(54) METHOD AND SYSTEM FOR ASSESSING AND OPTIMIZING CRUDE SELECTION

(75) Inventors: Martha Gardner, Niskayuna, NY (US); Rajesh Tyagi, Niskayuna, NY (US); Thomas Repoff, Sprakers, NY (US); Abhinanda Sarkar, Karnataka (IN); Angshuman Saha, West Bengal (IN); Shirley Au, Mt. Laurel, NJ (US); Roy Wilson, Spring, TX (US); Malcolm Craig Winslow, Houston, TX (US); Michael Dion, Chalfont, PA (US)

(73) Assignee: General Electric Company, Niskayuna, NY (US)

( * ) Notice: Subject to any disclaimer, the term of this patent is extended or adjusted under 35 U.S.C. 154(b) by 1688 days.

(21) Appl. No.: 10/643,191

(22) Filed: Aug. 18, 2003

(65) Prior Publication Data
US 2005/0050009 A1    Mar. 3, 2005

(51) Int. Cl.
*G06F 7/00* (2006.01)
*G06F 17/30* (2006.01)

(52) U.S. Cl. ................... 707/738; 707/749
(58) Field of Classification Search .......... 707/1–10, 707/100–104.4, 200–205
See application file for complete search history.

(56) References Cited

U.S. PATENT DOCUMENTS

| | | | |
|---|---|---|---|
| 5,457,625 A | 10/1995 | Lim et al. | |
| 5,901,069 A | 5/1999 | Agrafiotis et al. | |
| 6,093,211 A | 7/2000 | Hamielec et al. | |
| 6,611,735 B1 * | 8/2003 | Henly et al. | 700/266 |
| 6,735,541 B2 | 5/2004 | Kern et al. | |
| 6,792,399 B1 * | 9/2004 | Phillips et al. | 705/36 R |
| 2002/0116079 A1 | 8/2002 | Kern et al. | |
| 2005/0050041 A1 * | 3/2005 | Galindo-Legaria et al. | 707/4 |

FOREIGN PATENT DOCUMENTS

| | | |
|---|---|---|
| EP | 1 102 187 | 5/2001 |
| EP | 1102187 A2 | 5/2001 |
| JP | 11184861 A | 7/1999 |
| WO | WO 98 25218 | 11/1998 |

(Continued)

OTHER PUBLICATIONS

"Push/Pull Production Plan and Schedule Used in Modern Refinery CIMS," Xiong et al., Robotics and Computer Integrated Manufacturing, Pergamon Press, Oxford, GB, vol. 16, No. 6, Dec. 2000, pp. 397-410.

(Continued)

*Primary Examiner* — Hosain T Alam
*Assistant Examiner* — Navneet K Ahluwalia
(74) *Attorney, Agent, or Firm* — Mary Louise Gioeni

(57) ABSTRACT

A method and system for assessing and optimizing crude selection are provided. A predictive engine uses data from a database to execute at least one predictive performance model and/or at least one risk assessment model designed to optimize or improve refining operations during a refining process. The predictive engine takes as input key crude information corresponding to a particular crude or crude blend, e.g., at least one crude slate, and refinery operating parameters and/or conditions corresponding to a specific refinery and uses desirability metrics to assess the similarity to data in the database. Based on the resulting output, at least one predictive performance and/or at least one risk assessment model uses the output to predict performance or risk measures of refining the particular crude or crude blend using the specific refinery during the refining process, the probability of problems occurring during the refining process, the distribution of the problems throughout the refining process, etc.

27 Claims, 12 Drawing Sheets

FOREIGN PATENT DOCUMENTS

| WO | 01/08054 | 2/2001 |
|---|---|---|
| WO | 01/70912 | 9/2001 |
| WO | 02/21401 | 3/2002 |

OTHER PUBLICATIONS

"CrudeManager with ATS and Chevron Assay Library Modules," Online, Jul. 12, 2003, Spiral Software Limited, Internet, URL: http://web.archive.org/web/20030712144603, http://www.spiralsoft.co.uk/crudemanager/downloads.asp>.

"Simultaneous Optimization of Several Response Variables," Derringer et al., Journal of Quality Technology, American Society for Quality Control, vol. 12, No. 4, Oct. 1980, pp. 214-219.

Unofficial English Translation of Korean Office Action, response due Feb. 10, 2011, translation dated Mar. 10, 2011, 3 pages.

Derringer et al., "Simultaneous Optimization of Several Response Variables", Journal of Quality Technology, vol. 12, pp. 214-219, 1980.

* cited by examiner

Select a Refinery/Unit

R00001 ▼ | Refinery Not in List

Select Refinery Operating Parameters of Interest

| Include in Search | Operating Parameter | Imp. | Current | Units | Historical Range | | Goal |
|---|---|---|---|---|---|---|---|
| ☑ | Wash Water | 5 | 1.0 | 1=Yes 0=No | 0.0 | 1.0 | Target value ▼ |
| ☑ | Raw BSW | 5 | 0.025 | | 0.0 | 1.45 | Target value ▼ |
| ☑ | Raw Crude Salt Content | 5 | 2.0 | lbs/1000BBL | 0.0 | 150.0 | Target value ▼ |
| ☑ | Overhead Temp | 5 | 249.5 | degrees C | 0.0 | 300.0 | Target value ▼ |
| ☑ | Overhead Pressure | 5 | 23.95 | psi | 0.0 | 35.0 | Target value ▼ |
| ☑ | Overhead pH | 5 | 5.7 | pH | 0.0 | 7.0 | Target value ▼ |

Score Results of Selected Crude Slates

| Select | Match | Slate Crudes | Overhead Exchanger Corrosion | Desalter Efficiency | Matching Score for Crude Slate | Matching Score for Operating Condition | Overall Score |
|---|---|---|---|---|---|---|---|
| ⦿ | exact | ARAB EXTRA LIGHT (0.0%)<br>ARAB HEAVY (77.0%)<br>ARAB LIGHT (14.0%)<br>ARAB MEDIUM (0.0%) | 14.5 | 0.875 | .99 | 1.00 | .99 |
| ○ | subset | ARAB EXTRA LIGHT (0.0%)<br>ARAB HEAVY (77.0%)<br>ARAB LIGHT (14.0%)<br>ARAB MEDIUM (0.0%)<br>EDCENE (26.0%) | 14.5 | .0875 | .99 | 1.00 | .99 |

[Score using Model] [Modify Criteria]

FIG. 9A

Predictive Modeling User Input

Confirm Crude Slate:

| Crude Name | Current % | Target % |
|---|---|---|
| ARAB EXTRA LIGHT | 9.0 | 9.50 |
| ARAB HEAVY | 77.0 | 75.0 |
| ARAB LIGHT | 14.0 | 15.0 |
| ARAB MEDIUM | 0.0 | 0.50 |

← 900

TAN: * 0.25 ← 902

Responses

| Response | Goal | LSV | | USV | | Target |
|---|---|---|---|---|---|---|
| Corrosion | Minimize | 0 | mpy | 14.5 | mpy | |
| SRE | Maximize | 0.875 | % | 0.99 | % | |

Treatment Information

Desalter Treatments

| Name | Value | Rate | |
|---|---|---|---|
| | | Oil | Water |
| Primary Breaker | 2w157 | 4.949599809 | 0.0 |
| Reverse Breaker | n | 0.0 | |
| Wetting Agent | 2w801 | 0.949339988 | |

⟵ 908

Corrosion Treatments

| Name | Value | Rate |
|---|---|---|
| Neutralizing Amine * | dm5503 | 5.0 |
| Overhead Filmer | 5kb | 3.5 |
| Tower Filmer | null | 0.0 |

⟵ 910

Ammonia Rate: *  | 0.0 |  ⟵ 912

\* - denotes required fields to run example model

| Get Predictions | Reset | Back to Slates |

Top 10 Predicted Value/Scores - mock-up only

| Prediction Record | Slate Score | Treat Score | Operating Condition Score | Response - Corrosion | Response - SRE | Composite Score |
|---|---|---|---|---|---|---|
| 1 | .99 | 1 | 1.00 | 1.45 | | .99 |
| 2 | .99 | 1 | 1.00 | .46 | | .99 |
| 3 | .99 | 1 | 1.00 | .28 | | .99 |
| 4 | .99 | 1 | 1.00 | .66 | | .99 |
| 5 | .99 | 1 | 1.00 | .84 | | .99 |
| 6 | .99 | 1 | 1.00 | .77 | | .99 |
| 7 | .99 | 1 | 1.00 | .58 | | .99 |
| 8 | .99 | 1 | 1.00 | .86 | | .99 |
| 9 | .99 | 1 | 1.00 | .90 | | .99 |
| 10 | .99 | 1 | 1.00 | .85 | | .99 |

*Prediction 1 is calculated using model. Predictions 2 through 10 are simulated for for demo purposes, but will be calculated in future.

[Back to Model Input]

METHOD AND SYSTEM FOR ASSESSING AND OPTIMIZING CRUDE SELECTION

FIELD OF THE INVENTION

The present disclosure relates to the refining of crude oil, and particularly to a method and system for assessing and optimizing crude selection. Specifically, the present disclosure relates to a method and system to assist oil refineries in assessing and selecting crudes and crude blends that are not of optimum quality, as well as selecting appropriate chemical treatments and conditions to minimize operating problems with processing such crudes.

BACKGROUND OF THE INVENTION

Oil refineries are under intense pressure to process lower quality crudes for reasons of price or availability. However, in many cases, oil refiners do not possess enough information and knowledge about certain crudes and how they behave in an operating environment to make processing these crudes feasible and optimal. Individual refiners only have access to information and knowledge about crudes they have actually used or tested.

In an effort to address the problem of not possessing enough information about certain crudes and how they behave in an operating environment, some refiners have used laboratory simulations to develop predictive models of certain performances. These models, however, are limited and do not address specific, often complex problems that may arise during processing of these crudes and how these problems can be alleviated by using appropriate chemical treatment solutions.

Linear programming systems have also been implemented which focus on defining crude cut and the corresponding cut yield, but these systems do not address the use of treatment chemicals in the crude selection mode. These methods cannot tell refiners how the crude blends will affect operations and equipment. Therefore, refiners lack important information necessary to access the economic viability of using these crudes.

Accordingly, there is a need for a method and system for assessing and optimizing crude selection which overcomes drawbacks in prior art methodologies and systems.

BRIEF DESCRIPTION OF THE INVENTION

The invention provides a method and system for assessing and optimizing crude selection. In one aspect, the invention makes use of a database storing a massive amount of data, including experiential data related to different types of crudes, their test characterizations, operating conditions under which the crudes have been processed along with any associated processing difficulties and/or performance or risk parameters, and laboratory simulation data. The method and system use the data as the basis for at least one predictive performance model and/or at least one risk assessment model designed to optimize or improve a refining process.

The invention provides a predictive engine which accesses and uses the data stored in the database. The predictive engine takes as input key crude information corresponding to a particular crude or crude blend, e.g., at least one crude slate, and refinery operating parameters and conditions corresponding to a specific refinery and uses desirability metrics to assess the similarity to data in the database. Based on the resulting output, at least one predictive performance model and/or at least one risk assessment model uses the output to predict performance measures of refining the particular crude or crude blend using the specific refinery during a refining process, the probability of problems occurring during the refining process, the distribution of the problems throughout the refining process, etc. Different treatment options are then assessed by the predictive engine for optimizing or improving performance of the refining process.

The desirability metrics allow the user to assess how closely the exact "solution" has been seen before and the predictive performance models allow performance or risk parameters of interest, or probabilities thereof, to be estimated. As an example, the user may be interested in an estimate of the probability of fouling in the cold train for a particular crude. The predictive engine retrieves data relevant to the particular crude and fouling in refinery units and uses the data to assess how closely the previous experience matches the current state, and can then predict the fouling probability via a fitted empirical/statistical and/or physical/theoretical model.

The invention utilizes real, operational data and expert knowledge to derive the fitted models for performance parameters. The invention focuses on not only performance prediction, but also problem solution and serves as a decision support system.

Steps of the methods of the invention may be implemented by executing programmable instructions by a processor, where the programmable instructions or a portion thereof are stored on a computer readable medium or included in a computer data signal embodied in a transmission medium.

BRIEF DESCRIPTION OF THE DRAWINGS

FIG. 7 illustrates an exemplary screen view for entering inputs to be processed by a scoring operating conditions algorithm of the predictive engine;

FIG. 8 illustrates an exemplary screen view of score results of user-selected crude slates;

FIGS. 9a and 9b illustrate exemplary screen views for entering inputs for predictive modeling by the predictive engine;

FIG. 11 illustrates an exemplary screen view of results provided by a predictive modeling procedure using the predictive engine.

DETAILED DESCRIPTION OF THE INVENTION

Figure 1:
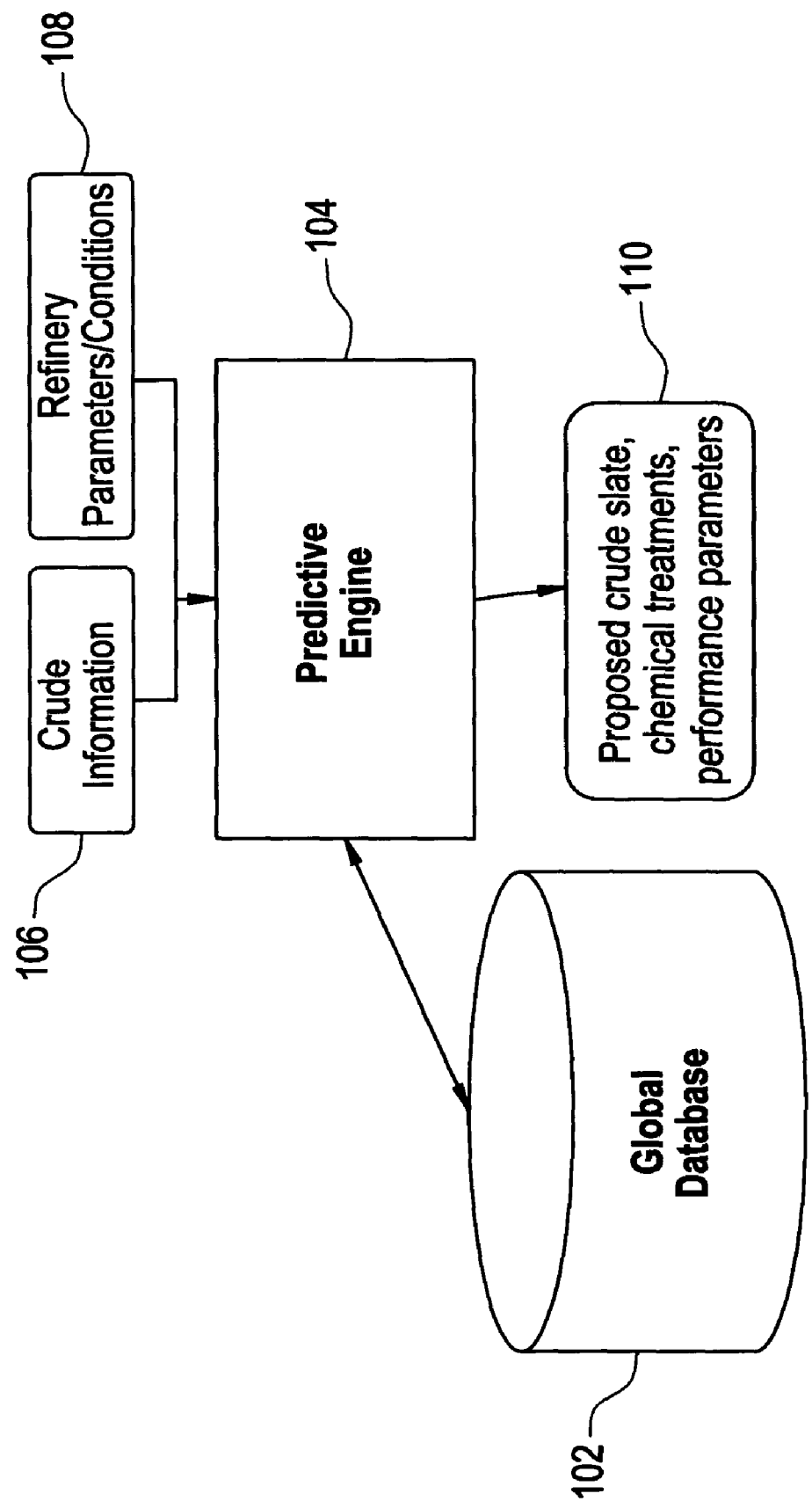
FIG. 1 is a block diagram of an illustrative embodiment of a system for accessing and optimizing crude selection.

The system and method for accessing and optimizing crude selection of the invention is described herein below with reference to FIGS. 1-5. With reference to FIG. 1, there is shown a block diagram of the system for accessing and optimizing crude selection and designated generally by reference numeral 100. The system 100 includes a database 102 storing a massive amount of data, including experiential data, related to different types of crudes, their test characterizations, operating conditions under which the crudes were processed along with any associated processing difficulties and/or performance or risk parameters, and laboratory simulation data. The method and system use the data as the basis for at least one predictive performance model and/or at least one risk assessment model designed to optimize or improve a refining process. The resulting outputs of these models are shown by FIG. 11.

The system 100 further includes a predictive engine 104 which accesses and uses the data stored in the database 102. The predictive engine 104 takes as input key crude information 106 corresponding to a particular crude or crude blend, e.g., at least one crude slate, and refinery operating parameters and conditions 108 corresponding to a specific refinery and uses desirability metrics to assess the similarity to data in the database 102. The predictive engine 104 uses a sequence of algorithms for intelligently searching and assessing data stored in the database 102, and models for predicting performance or risk parameters. The predictive engine 104 outputs proposed crude slate, chemical treatments and predicted performance parameters 110. The database 102 can be remotely located from the predictive engine 104 and connected to the predictive engine 104 via conventional networking systems, such as a LAN, WAN, the Internet, etc.

Based on the resulting output, at least one predictive performance model and/or at least one risk assessment model uses the output to predict performance measures of refining the particular crude or crude blend using the specific refinery during a refining process, the probability of problems occurring during the refining process, the distribution of the problems throughout the refining process, etc. These predictive performance models and/or risk assessment models can be part of the predictive engine 104, as described herein below with reference to tier two of FIG. 5, or an external engine. Different treatment options are assessed by the predictive engine 104 for optimizing or improving performance of the refining process. The treatment options accessed are preferably based on metrics customized to a particular refiner's requirements.

Figure 2:
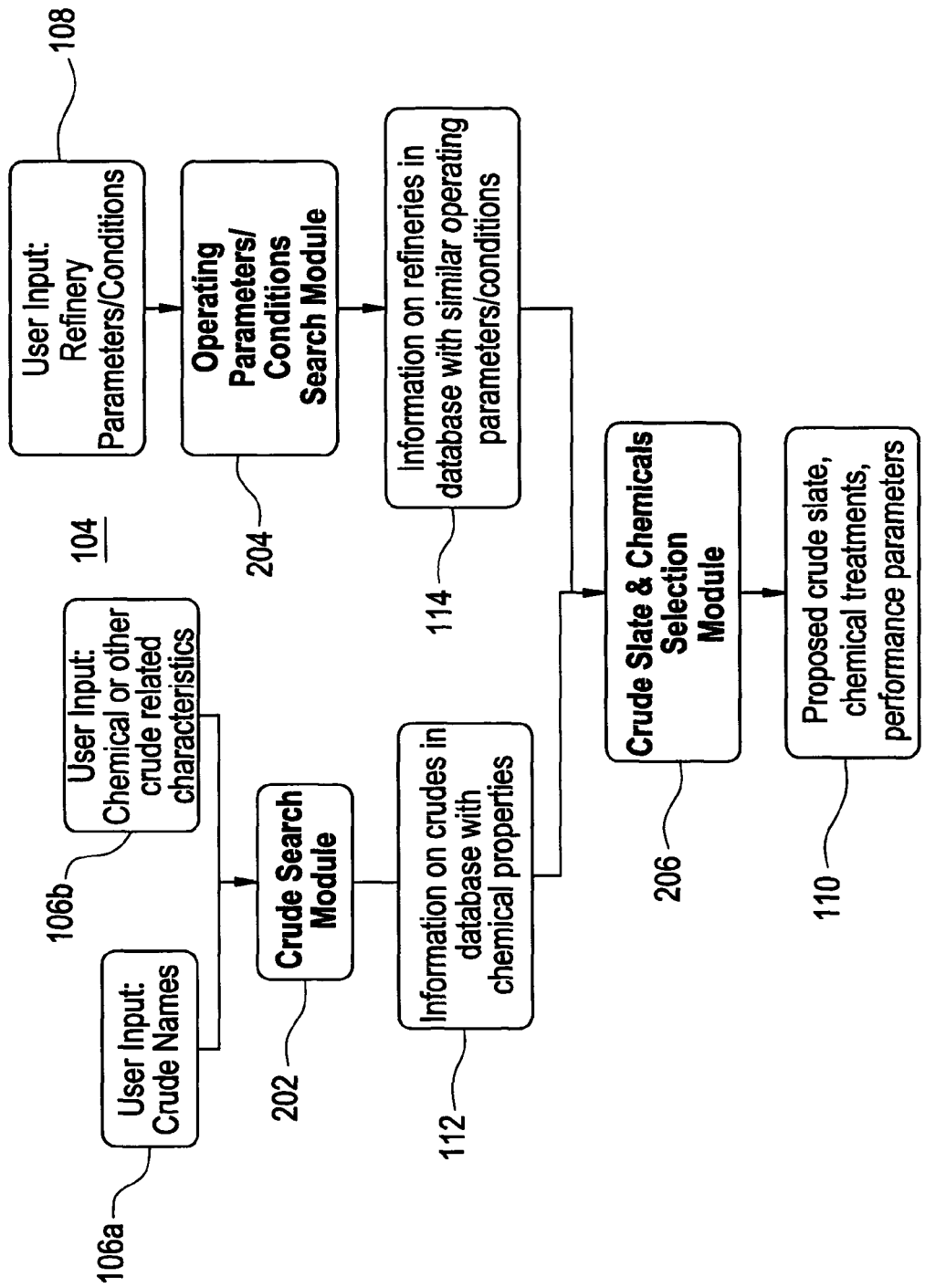
FIG. 2 is an operational flow chart of a predictive engine of the system for accessing and optimizing crude selection.

FIG. 2 is an operational flow chart of the predictive engine 104 showing a crude search module 202, an operating parameters/conditions search module 204, and a crude slate and chemicals selection module 206. The various functions or methods of the predictive engine 104 are performed by these modules, as further described below, by utilizing information stored in the database 102 and by having at least one processor execute a set of programmable instructions corresponding to each of the modules.

Hence, the predictive engine 104 is a programmable engine which includes all of the sets of programmable instructions corresponding to each of the three modules. The programmable instructions or a portion thereof can be stored on the at least one processor. The programmable instructions or a portion thereof can also be stored on a computer readable medium or included in a computer data signal embodied in a transmission medium.

Upon executing the programmable instructions, the system 100 of the invention provides a technical effect. The technical effect is to output results of algorithms and models indicating the desirability of the proposed crude slate, chemical treatments and predicted performance or risk information 110, as well as any other relevant information, such as operating conditions.

With continued reference to FIG. 2, the crude search module 202 takes as user inputs at least one crude name 106a and at least one chemical or other crude characteristic 106b of at least one crude identifiable by at least one crude name 106a. The output of the crude search module 202 is information 112 with respect to at least one crude stored in the database 102. At least one crude output by the crude search module 202 corresponds to at least one crude identifiable by the at least one crude name 106a, or corresponds to at least one crude having at least one chemical or other property similar to at least one chemical or other property of at least one crude identifiable by at least one crude name 106a.

The operating parameters/conditions search module 204 takes as user input at least one refinery operating parameter and/or condition 108 and outputs information 114 stored in the database 102 indicating at least one refinery having at least one identical or similar operating parameter and/or condition compared to the user input. The information 112 output by the crude search module 202 and the information 114 output by the operating parameters/conditions search module 204 is input to the crude slate and chemicals selection module 206 as shown in FIG. 2. The output of the crude slate and chemicals selection module 206 is the desirability of the proposed crude slate, chemical treatments and performance or risk parameter information 110, as well as other relevant information, such as operating conditions.

Crude Search Module

Figure 3:
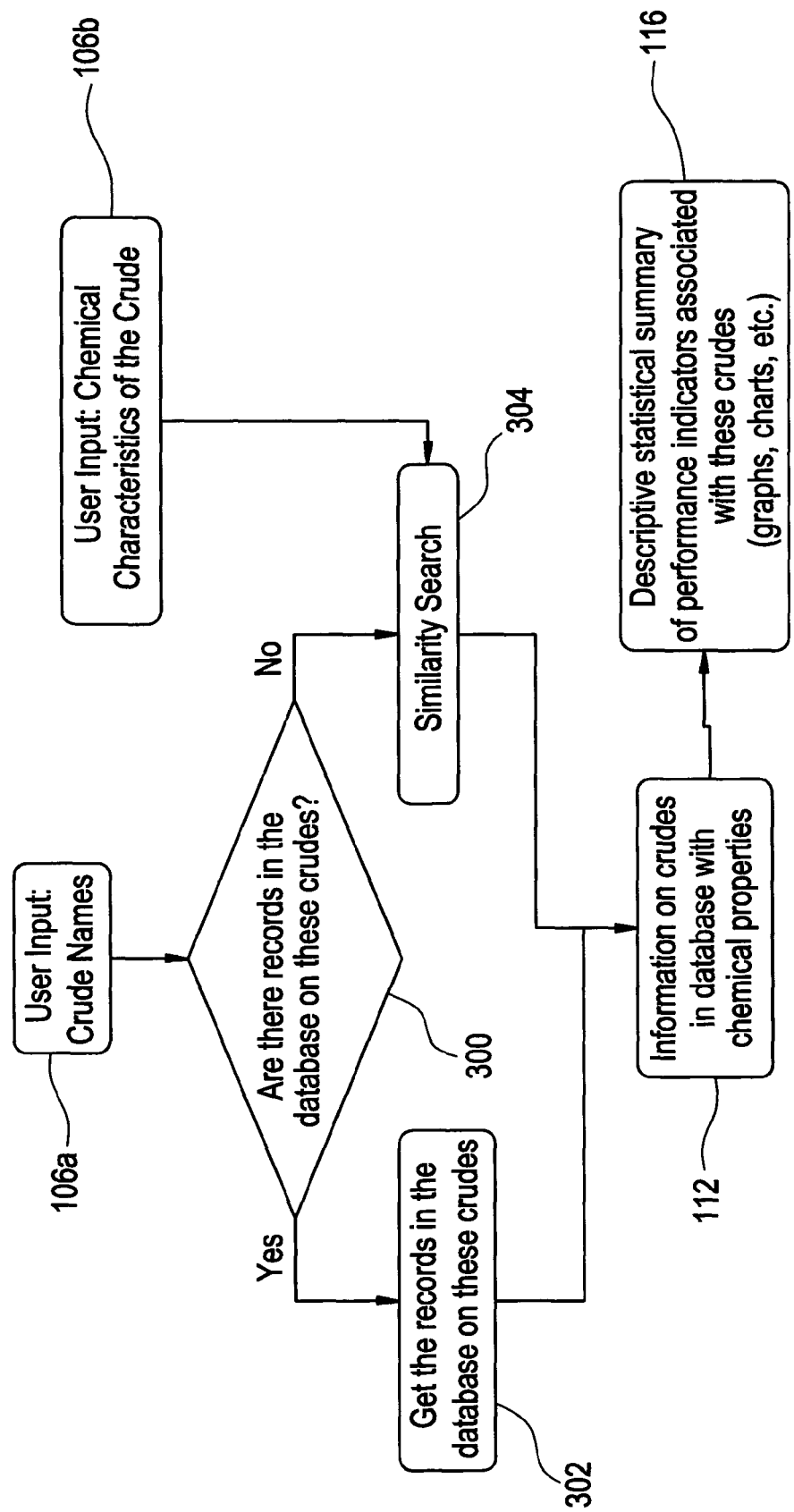
FIG. 3 is an operational flow chart of a crude search module of the predictive engine.

With reference to FIG. 3, there is shown an operational flow chart of the crude search module 202 of the predictive engine 104. As described above, the crude search module 202 has as user inputs at least one crude name 106a and at least one chemical or other characteristic 106b of at least one crude identifiable by the at least one crude name 106a. The output of the crude search module 202 is information 112 corresponding to at least one crude stored in the database 102.

The crude search module 202 takes at least one crude name 106a and determines at step 300 whether there is at least one record in the database 102 having at least one crude identifiable by the at least one crude name 106a. If there is at least one record in the database 102 having at least one crude identifiable by at least one crude name 106a, the process proceeds to step 302, and if not, the process proceeds to step 304. At step 302, the at least one record in the database 102 having the at least one crude identifiable by the at least one crude name 106a is accessed.

At step 304, the crude search module 202 searches the database 102 for at least one record having a similar crude compared to at least one crude identifiable by at least one crude name 106a based on at least one chemical or other characteristic 106b. Information obtained either at step 302 or step 304 is output by the crude search module 202. Therefore, as stated above, at least one crude output by the crude search module 202 corresponds to at least one crude identifiable by at least one crude name 106a, or corresponds to at least one crude having at least one chemical or other property similar to at least one chemical or other property of at least one crude identifiable by at least one crude name 106a.

The crude search module 202 can also output data 116 indicating statistical performance and other information corresponding to the at least one crude output by the module 202. The data 116 can be presented in visual form, i.e., in the form of graphs, charts, etc. The data 116 can be accessed from the database 102, or calculated by the crude search module 202 using precursor data stored in the database 102, or elsewhere, e.g., a refinery's computer system.

Operating Parameters/Conditions Search Module

Figure 4:
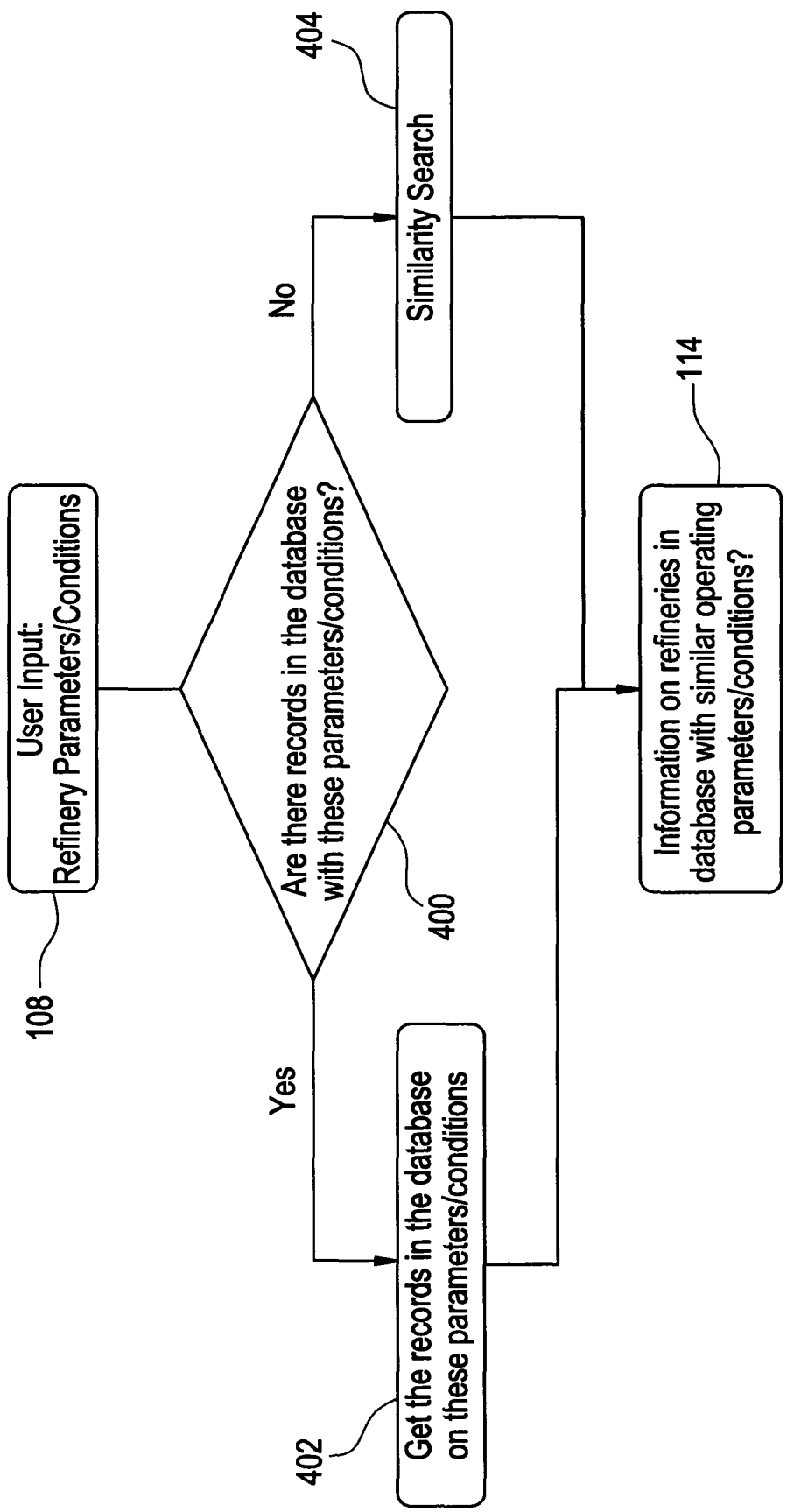
FIG. 4 is an operational flow chart of an operating conditions search module of the predictive engine.

With reference to FIG. 4, there is shown an operational flow chart of the operating parameters/conditions search module 204 of the predictive engine 104. As described above, the operating parameters/conditions search module 204 has as user input at least one refinery operating parameter and/or condition 108 and outputs information 114 stored in the database 102 indicating at least one refinery having at least one identical or similar operating parameter and/or condition compared to the user input.

The operating parameters/conditions search module 204 takes the at least one refinery operating parameter and/or condition 108 and determines at step 400 whether there is at least one record in the database 102 identifying at least one refinery having the at least one refinery operating parameter and/or condition 108. If there is at least one record in the database 102 identifying at least one refinery having the at least one refinery operating parameter and/or condition 108, the process proceeds to step 402, and if not, the process proceeds to step 404. At step 402, the at least one record in the database 102 identifying at least one refinery having the at least one refinery operating parameter and/or condition 108 is accessed.

At step 404, the operating parameters/conditions search module 204 searches the database 102 for at least one refinery having at least one similar operating parameter and/or condition compared to the at least one refinery operating parameter and/or condition 108. Information obtained either at step 402 or step 404 is output by the operating parameters/conditions search module 204 as information 114. Therefore, as stated above, information 114 indicates at least one refinery having at least one identical or similar operating parameter and/or condition as the at least one user input operating parameter and/or condition 108.

Crude Slate and Chemicals Selection Module

Figure 5:
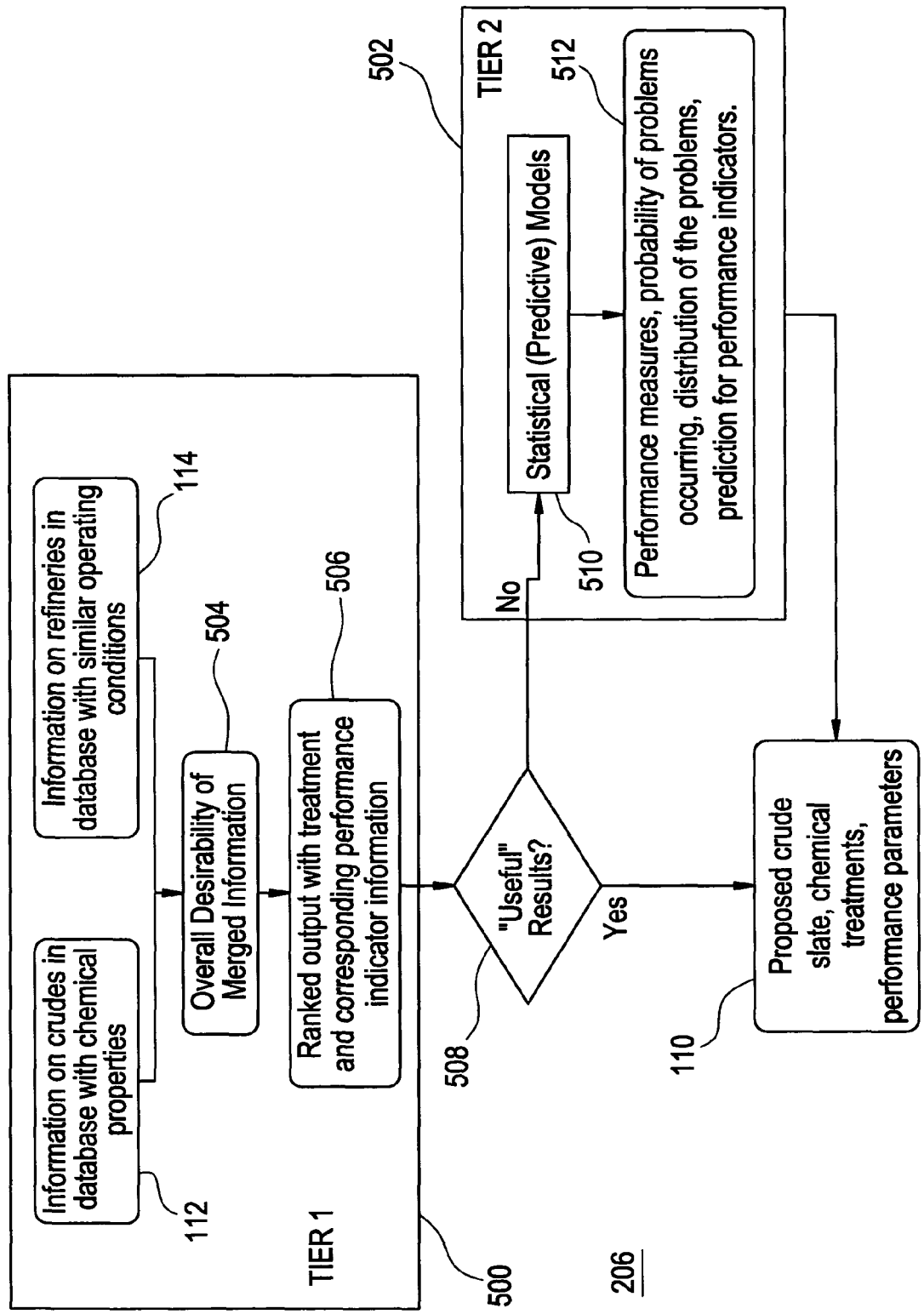
FIG. 5 is an operational flow chart of a crude slate and chemicals selection module of the predictive engine.

With reference to FIG. 5, there is shown an operational flow chart of the crude slate and chemicals selection module 206 of the predictive engine 104. This module 206 includes two operating tiers, tier one and tier two, which are identified by reference numerals 500 and 502, respectively, in FIG. 5. The operational steps of tier one are always performed, whereas the operational steps of tier two are optional and would be mainly performed if the data output by tier one does not provide useful results, as further described below.

1. Tier One

The crude slate and chemicals selection module 206 has as inputs the output information 112, 114 from the crude search module 202 and the operating parameters/conditions search module 204. Within tier one, at step 504, the two sets of information 112, 114 are scored and merged, and the overall desirability of the merged information is determined, as further described below in the Tier One: Algorithms for Predictive Engine section. At step 506, an output is gleaned which includes a ranked output based on the determined overall desirability of the merged information, and output data including treatment and corresponding performance indicator information. Following step 506, the process exits tier one.

At step 508, the user should assess the practical applicability of the results to help determine whether the output would be useful, i.e., whether the output contains adequate information which would enable the user to make an informed decision regarding the use of the specific refinery to refine the particular crude or crude blend. If yes, the crude slate and chemicals selection module 206 provides the output to the user. The output, as mentioned above, includes the proposed crude slate, chemical treatments and performance parameter information 110, as well as other relevant information, such as operating conditions.

2. Tier Two

If at step 508, it is determined that the output may not be useful to the user, the user has the option to enter tier two. At step 510 within tier two, the at least one predictive performance model and/or the at least one risk assessment model uses the output from step 506, as further described below in the Tier Two: Models for Predictive Engine section, to predict at step 512 performance measures of refining the particular crude or crude blend, e.g., the at least one crude slate, using the specific refinery, the probability of problems occurring during refining, the distribution of the problems throughout the refining process, etc.

Additionally, as shown by FIG. 5, performance indicators, such as corrosion, fouling, and desalter efficiency, are also predicted by at least one predictive performance model and/or at least one risk assessment model at step 512. Tier two then outputs the proposed crude slate, chemical treatments and KPI information 110, as well as other information, as determined by the at least one predictive performance model and/or the at least one risk assessment model.

3. Tier One: Algorithms for Predictive Engine

Three basic algorithms are used by tier one of the crude slate and chemicals selection module 206. The algorithms in their current form employ and extend the desirability metric approach as described in Derringer and Suich (Simultaneous Optimization of Several Response Variables, *Journal of Quality Technology*, 12, 4, 214-219), although these algorithms could be modified to employ any variety of other fuzzy logic approaches. The entire contents of the journal article are incorporated herein by reference. The three algorithms are: a scoring crude slate data algorithm; a scoring operational data algorithm; and a merging data algorithm. The purpose or function of the scoring crude slate data algorithm is to aid the user in identifying at least one crude slate stored in the database that is similar to at least one user-desired crude slate, e.g., the at least one crude slate, by scoring each crude slate component based on how well each crude slate component satisfies the user criteria; then all individual scores of the at least one user-desired crude slate are combined to provide a composite crude slate score.

The purpose or function of the scoring operation data algorithm is to score each individual parameter or condition based on how well the individual parameter and/or condition satisfies the user criteria for that parameter and/or condition and output an operational score; then all individual operational scores are combined to provide a composite operational score. The purpose or function of the merging data algorithm is to determine a highest total overall composite score by combining composite crude slate and composite operational scores as described below.

3.a. Scoring Crude Slate Data Algorithm

Figure 6:
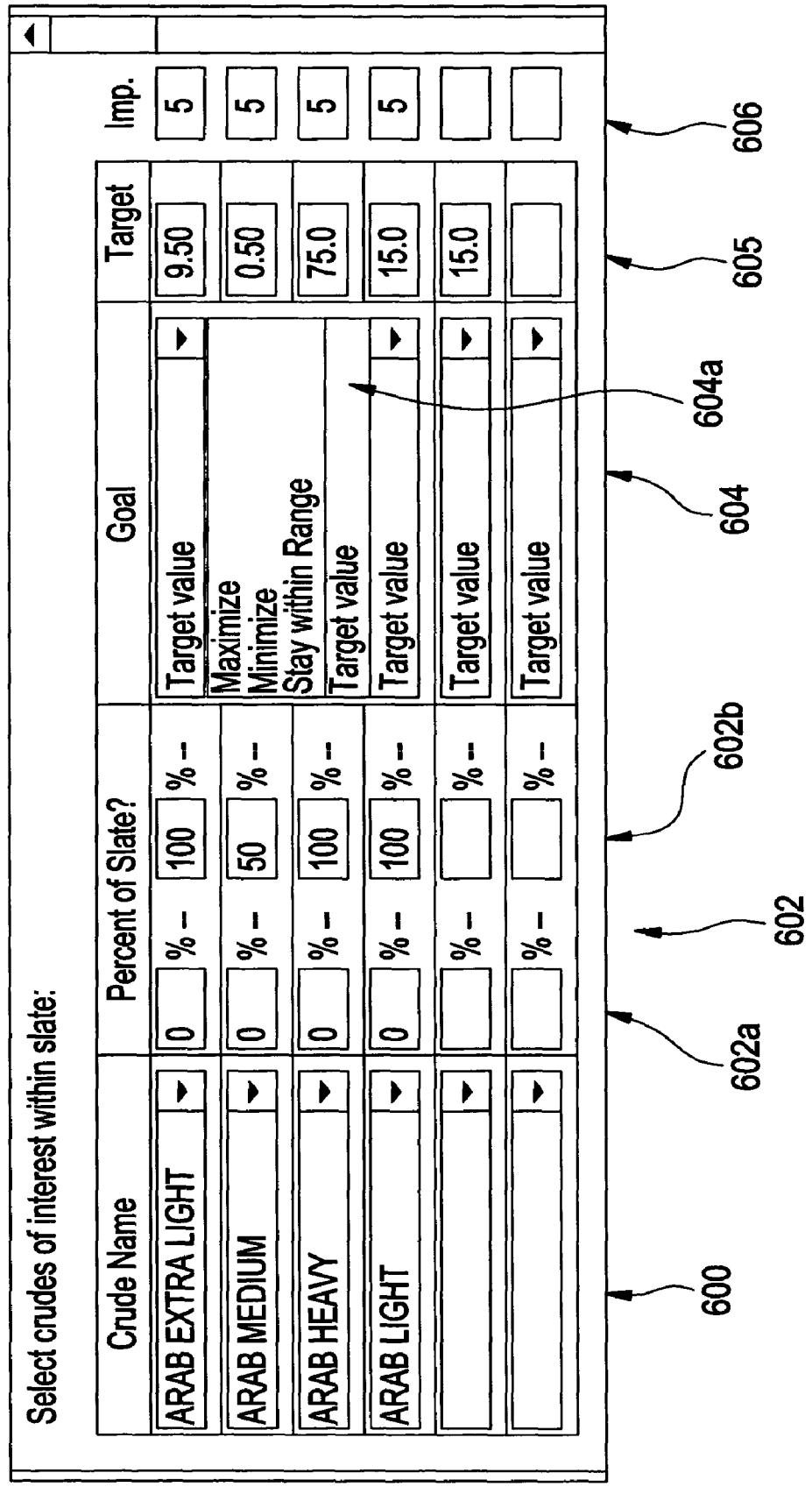
FIG. 6 illustrates an exemplary screen view for entering inputs to be processed by a scoring crude slate data algorithm of the predictive engine.

The user inputs for the scoring crude slate data algorithm are (1) crudes of interest which are preferably selected from a drop-down menu 604a (see FIG. 6); (2) goal or objective options (maximize, minimize, target and range) are selected for each crude of interest within slate; (3) upper and lower search values (USV and LSV) if maximize, minimize and range are the selected goal options, and target, upper and lower search values (target, USV and LSV) if target is the chosen goal option; (4) degree of importance chosen from high, medium and low (coded as 5, 3, and 1); and (5) data from database 102 (e.g., Y_Values as explained below).

FIG. 6 illustrates an exemplary screen view for entering the user inputs to be processed by the scoring crude slate data algorithm. In a first column 600, user input (1) is entered; in a second column 602, user inputs (3) are entered, i.e., the LSV 602a and the USV 602b; in a third column 604, user input (2) is entered; in a further column 605, the target value is entered if the goal is target; and in a fifth column 606, user input (4) is entered.

The USV and LSV are selected according to the following rules: If the goal or objective is to maximize the selected crude of interest, the value for the LSV should be the smallest value which the user will be completely dissatisfied (i.e., 0% satisfaction) and the value for the USV should be the largest value which the user will be completely satisfied (i.e., 100% satisfaction). If the goal or objective is to minimize the selected crude of interest, the value for the LSV should be the smallest value which the user will be completely satisfied (i.e., 100% satisfaction) and the value for the USV should be the largest value which the user will be completely dissatisfied (i.e., 0% satisfaction).

If the goal or objective is target, the LSV and USV should be values where a percentage falling outside these values the user will be completely dissatisfied (i.e., 0% satisfaction) and the user will be completely satisfied at a target point of the LSV and USV (i.e., 100% satisfaction). The target point is defined by the user and is case specific. If the goal or objective is range, the LSV and USV should be values where a percentage falling outside these values the user will be completely dissatisfied (i.e., 0% satisfaction) and the user will be completely satisfied with a percentage falling between the LSV and the USV (i.e., 100% satisfaction).

In all cases, the default LSV and USV are the minimum and maximum percentages as observed by the data stored in the database 102 for each individual crude component. Examples are provided below for four different cases, i.e., maximize, minimize, target and range.

Case 1: The user wants to have as much Arab Heavy crude as possible in the slate. In this case, the goal is to maximize Arab Heavy crude and the LSV is 0% and the USV is 100%. The LSV and USV are default values. These values represent the range in the database 102, i.e., for all records in the database 102 that contain a specific crude, the lowest and highest percentages used in the past. This is how the system default LSV and USV values are defined for all cases, but any of these values can be edited by the user.

Case 2: The user wants to have as less of Arab Medium crude as possible in the slate. In this case, the goal is to minimize Arab Medium crude and the system default LSV is 0% and the system default USV is 50%.

Case 3: The user wants to use exactly 9.5% of Arab Extra Light crude in the slate, if possible. In this case, the goal is target and the user-selected target value is 9.5%, the system default LSV is 0% and the system default USV is 100%. This case is shown in FIG. 6.

Case 4: The user just wants to make sure there is Arab Light crude in the slate. In this case, the goal is range and the LSV is 1% and the USV is 100%. In this case, the LSV is user-defined and USV is a system default value.

The scoring crude slate data algorithm provides an individual score to each crude slate component based on how well the crude slate component satisfies the user criteria. All individual scores of the at least one user-desired crude slate are then combined to provide the composite crude slate score for that crude slate. The user can opt to view the detailed scoring and also has the option to modify the user inputs or criteria based on the output.

The inputs received for each crude slate component and calculations performed by the crude slate data algorithm for determining an individual score for each crude slate component and the composite crude slate score are the following:

Inputs:
User Specified Inputs For Each Component:

| | Possible Input Values: |
|---|---|
| GOAL | Maximize, Minimize, Target, Range |
| LSV | Continuous |
| TARGET | Continuous |
| USV | Continuous |
| WT (weight) | (fixed at 1 in current embodiment, but could vary, usually from 1-10) |
| IP (Importance) | 1 (low), 3 (medium), 5 (high) |
| Y_Value | Continuous |

In the calculations shown below, Y refers to any property which is being scored: individual crude properties, crude slate properties, operating parameters, or performance parameters would be some examples. The Y_values are retrieved from the database 102 or another database.

Calculations:
Calculate IND_D for each Y specified by the user:
If goal is maximize:
IND_D=0 if Y_Value<LSV
IND_D=1 if Y_Value>USV
otherwise calculate:
IND_D=[(Y_Value−LSV)/(USV−LSV)]$^{WT}$
If goal is minimize:
IND_D=0 if Y_Value>USV
IND_D=1 if Y_Value<LSV
otherwise calculate:
IND_D=[(Y_Value−USV)/(LSV−USV)]$^{WT}$
If goal is target:
If Y_Value>=Target and
If Y_Value>USV then IND_D=0
IND_D=[(Y_Value−USV)/(Target−USV)]$^{WT}$
If Y_Value<Target and
If Y_Value<LSV then IND_D=0
IND_D=[(Y_Value−LSV)/(Target−LSV)]$^{WT}$
If goal is range:
IND_D=1 if LSV<=Y_Value<=USV
otherwise IND_D=0

The composite crude slate score (composite_D) corresponding to the crude slate is then computed as follows:
Composite_D=[product of all (IND_D$^{IP}$)]^(1/sum of all IP).

A scoring example is illustrated below using the crude slate data algorithm for a crude slate having the following crudes: Duri, Griffin, Agha Jari and Iran-Heavy.

Inputs:

| Component | Goal | LSV | Target | USV | Importance | Y_Value |
|---|---|---|---|---|---|---|
| Duri | Maximize | 40 | | 47 | Medium (3) | 46 |
| Griffin | Target | 11 | 13 | 15 | High (5) | 13.2 |
| Agha Jari | Maximize | 80 | | 92 | High (5) | 90.3 |
| Iran-Heavy | Minimize | 24 | | 26 | Low (1) | 20 |

Calculations:

| Component | IND_D | |
|---|---|---|
| Duri | 0.857 | [(46 − 40)/(47 − 40)]$^1$ |
| Griffin | 0.900 | [(13.2 − 15)/(13 − 15)]$^1$ |

-continued

| Component | IND_D | |
|---|---|---|
| Agha-Jari | 0.858 | $[(90.3 - 80)/(92 - 80)]^1$ |
| Iran-Heavy | 1 | Since 20 < 24 |

Composite_D or the composite crude slate score for the crude slate then equals 0.88, i.e., $[(0.857^3)(0.90^5)(0.858^5)(1^1)]^{\wedge}(1/14)=0.88$.

3.b. Scoring Operational Data Algorithm

The user inputs for the scoring operational data algorithm are (1) operational parameters and/or conditions of interest; (2) goal options for parameters and/or conditions (maximize, minimize, target and range, where target is default goal) are selected using a drop-down menu; (3) upper and lower search values (USV and LSV) if maximize, minimize and range are the selected goal options, and target, upper and lower search values (target, USV and LSV) if target is the chosen goal option (i.e., same as the scoring crude slate data algorithm); (4) degree of importance chosen from high, medium and low (i.e., same as the scoring crude slate data algorithm); (5) desired units (ISO or ASTM units) for the parameters and/or conditions of interest; and (6) data from database 102 (e.g., Y_Values).

FIG. 7 illustrates an exemplary screen view for entering the user inputs to be processed by the scoring operational data algorithm. In a first column 700, the user checks off whether to include the parameter and/or condition in a search of the database 102; in a second column 702, user input (1) is entered; in a third column 711, user input (4) is entered; in a fourth column 704, the current value is entered; in a fifth column 706, user input (5) is entered; in a sixth column 708, user inputs (3) are entered, i.e., the LSV 708a and the USV 708b; and in a seventh column 710, user input (2) is entered.

The scoring operational data algorithm provides an individual score to each parameter and/or condition based on how well it satisfies the user criteria for that parameter and/or condition. All individual scores are then combined to provide the composite operational score.

For each quantitative parameter and/or condition, such as overhead temperature, the same calculations as the calculations illustrated above with reference to the crude slate data score algorithm are performed by the scoring operational data algorithm to obtain the composite operational score. For any categorical parameters and/or conditions, such as primary wash water source for the desalter which can take values such as strip sour water, boiler feed water, vacuum condensate, etc., a score of one is automatically assigned, if the parameter and/or condition is preferred, and a score of zero is automatically assigned, if the parameter and/or condition is not preferred. Missing parameters and/or conditions are automatically assigned a score of zero. The user can opt to view the detailed scoring and also has the option to modify the user inputs or criteria based on the output.

U.S. Patent Application titled "Systems and Methods for Designing a New Material that Best Matches a Desired Set of Properties," filed in October 2002 and assigned U.S. patent application Ser. No. 10/281,658 discloses and describes scoring methods and algorithms; the entire contents of the patent application are incorporated herein by reference.

3.c. Merging Data Algorithm

The user inputs for the merging data algorithm are (1) all the individual composite crude slate scores corresponding to each crude slate as determined by the crude slate data algorithm; (2) all the individual composite operational scores corresponding to the individual parameters and/or conditions as determined by the scoring operational data algorithm; and (3) response parameters and/or conditions of interest to the user, such as probability of refinery fouling, desalter efficiency, and probability of refinery corrosion.

The merging data algorithm processes the input data and provides as outputs in ascending or descending order the crude slates having the highest total overall composite scores by combining composite crude slate and composite operational scores to obtain the overall or composite score. In a preferred embodiment, the overall or composite score for each crude slate is obtained by extending the weighted geometric average approach by multiplying the two individual composite scores corresponding to each crude slate which were obtained by the scoring crude slate data and scoring operational data algorithms. In the example below, the individual scores are weighted as equally high importance (the importances range from 1-5):

$[(\text{Composite Crude Slate Score})^5 (\text{Composite Operational Score})^5]^{\wedge}(1/10)$ The merging data algorithm also outputs response parameter values for the response parameters and/or conditions of interest to the user, and treatment information for the specific refinery. The treatment information includes information for treating the response parameters and/or conditions of interest to the user, as well as other possible refinery responses.

FIG. 8 illustrates an exemplary screen view showing the score results of selected crude slates. In a first column 800, the user can select a crude slate by checking its corresponding box; in a second column 802, each crude slate is classified as "exact" or "subset" based on whether or not the crudes of interest are the only ones in the data record or if there are other crudes present in addition to the ones of interest, respectively; in a third column 804, the percentages of various crudes comprising each crude slate are provided; in a fourth column 806, the various crudes comprising each crude slate are provided; in a fifth column 808, the probability of fouling for each crude slate is provided; in a sixth column 810, the desalter efficiency for each crude slate is provided; in a seventh column 812, the matching score for each crude slate is provided as determined by the scoring crude slate data algorithm (the matching score is the same as the composite crude slate score); in an eighth column 814, the matching score for each operating condition is provided as determined by the scoring operational data algorithm (the matching score is the same as the composite operational score); and in a ninth column 816, the overall or composite score is provided.

The user can select in the second column either "exact" or "subset" to obtain more detailed information. The user can also select to score the data using the at least one predictive performance model and/or the at least one risk assessment model by selecting the icon labeled "Score using Model" 818. The user can also select to modify criteria for obtaining different results by selecting the icon labeled "Modify Criteria" 820.

The data as shown in FIG. 8 is sorted according to the overall or composite score, i.e., in descending order from top to bottom. The data can also be sorted according to the response parameters and/or conditions of interest to the user, in ascending or descending order.

4. Tier Two: Models for Predictive Engine

The purpose of tier two is to allow the user to obtain predicted response parameters of interest for selected crude slates and operational parameters and/or conditions using at least one predictive performance model and/or at least one risk assessment model designed to optimize or improve refining operations during the refining process of the particular crude or crude blend. The inputs to tier two are (1) all outputs from tier one as shown for example in FIG. 8; (2) selected treatments of interest; (3) the goal for each response parameter of interest (i.e., maximize, minimize, target, and range); and (4) data from the database 102 or other database. Tier two utilizes empirical/statistical and/or theoretical/physical models which may be implemented in statistical or other types of software; constrained optimization algorithms/procedures; and scoring algorithms to derive outputs. The empirical/statistical and/or theoretical/physical models make up or comprise the at least one predictive performance model and the at least one risk assessment model.

The empirical/statistical and/or theoretical/physical models may include, but are not limited to, models such as linear regression models; logistic regression models; non-linear regression models; classification and regression trees and extensions thereof; multiple additive regression splines and extensions thereof; partial least squares regression models; generalized additive models; neural networks and extensions thereof, such as projection pursuit regression; simulation models; expert system-based models, such as Bayesian Belief Networks; theoretical calculation models; engineering economic models; financial risk models; decision analytic models; and engineering process models based on chemistry, physics and engineering principles, such as reaction kinetics and thermodynamics, mass transfer, energy transfer, separation processes, and fluid dynamics. The constrained optimization procedures may include, but are not limited to, mesh constraint procedures, any general non-linear algorithm with constraints, or other penalty function approaches.

In addition, the models are not limited to one model per performance or risk parameter. The models can take parallel or sequential paths. For example, multiple models may be needed to predict salt removal efficiency and identify corresponding chemical treatments and dosage rates. Output of these models may then serve as input to other models for other performance or risk parameters. For example, outputs of the desalter models may then serve as input to the overhead exchanger corrosion models. The overall outputs include predicted or calculated response parameters, treatment information, and overall scores including response scores and treatment scores.

FIGS. 9A and 9B illustrate exemplary screen views for entering inputs for predictive modeling during tier two, where the goal is target. First, as shown by block 900, the crude slates are confirmed and the target percentages are entered for each crude. The target percentages are used to convert individual assay information into blended assay information for input into the predictive models. Block 902 indicates the TAN (Total Acid Number) Value which in this example is 0.25. Second, at block 904, the goal 904a for each response parameter of interest is selected and the corresponding LSV 904b and USV 904c are entered, including the target percentage 904d.

With continued reference to FIG. 9B, at block 906, the treatments of interest are selected. In a first block 908, the desalter treatments are selected, in a second block 910, the corrosion treatments are selected, and in a third block 912, the ammonia rate is entered. In this example, the ammonia rate is 0.0. Preferably, the values and rates shown by FIG. 9B are automatically filled in using the recent database entries corresponding to these values and rates for the specific refinery selected by the user in a screen displayed prior to the screens shown by FIGS. 9A and 9B. The user then selects one of the following icons to continue: "Get Predictions" 914 for performing predictive modeling using the predictive models of the predictive engine 104; "Reset" 916 for erasing all entries; and "Back to Slates" 918 for returning to the screen view illustrated by FIG. 8.

If the "Get Predictions" icon is selected the predictive engine 104 performs predictive modeling using the entries provided in the screen views illustrated by FIGS. 9A and 9B, as well as additional information received as input information by tier two and mentioned above, such as, for example, data from the database 102 or other database.

Figure 10:
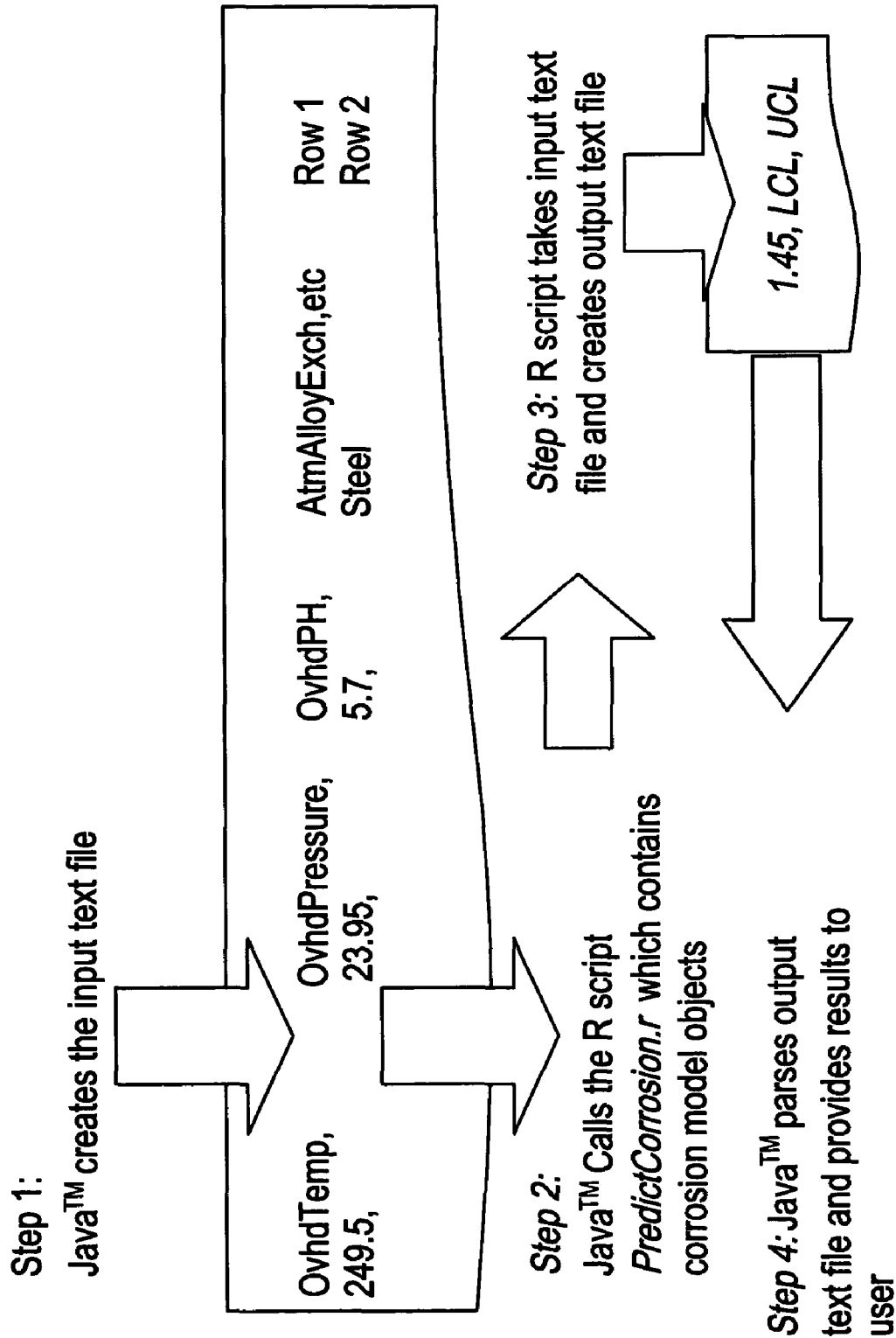
FIG. 10 illustrates an exemplary predictive modeling procedure for predicting corrosion using the predictive engine.

FIG. 10 illustrates an exemplary predictive modeling procedure for predicting corrosion and capable of being performed by the predictive engine 104. The predictive modeling procedure uses Java™ to create an input text file at step 1. The input text file contains two rows (Row 1 and Row 2); the first row (Row 1) contains the variable names, such as, for example, overhead temperature (OvhdTemp), overhead pressure (OvhdPressure), overhead pH (OvhdPH), and alloy used in the exchanger of the atmospheric tower (AtmAlloyExch), and the second row (Row 2) contains values or data corresponding to the various variable names of the first row (Row 1).

At step 2, Java™ accesses the software where the models are constructed and stored. In one embodiment, the software used is R and is accessed via a R script routine. Models may be built and are stored as objects within R. At step 3, the R script routine takes the input text file and creates an output text file. In this example, the output text file has one row with three columns. The first value on the left is the predicted corrosion and the other two entries are the lower and upper end points of a 95% prediction interval. Depending on the number of performance and risk parameters of interest to the user, the quantity of output will vary.

Finally, at step 4, Java™ parses the output text file and provides the results to the user by various means, such as via a screen view, as shown, for example, by the exemplary screen view of FIG. 11.

In FIG. 11, the top row is the prediction using the input values described above for tier two, and the other rows are ranked results using one possible constrained optimization procedure as described below.

The constrained optimization procedure utilizes the mesh constraint algorithms. The procedure considers ±10% of the target percentage provided by the user as the upper and lower values for the crude slate components and other operational/treatment parameters provided as inputs to tier two. If there are n components, a mesh is built around all n components. For formulation components, the n components are summed and combinations which have a sum less than the total, e.g., 100%, are ignored. For runs where the sum is greater than the total, the total is subtracted from the sum and the result is subtracted from each of the individual components one at a time while checking to determine whether the result is still within the individual bounds. Finally, the results are checked to determine if there are any duplications.

An example of a constrained optimization procedure of the invention follows. A crude slate contains four different crudes: A, B and C, where 10%<A<40%, 20%<B<50%, 10%<C<70% and the total is 100%. Using a mesh size of three, the subset of the mesh is the following:

| A | B | C | Sum | |
|---|---|---|---|---|
| 10 | 20 | 30 | 60 | Ignore |
| 10 | 30 | 10 | 50 | Ignore |
| 40 | 30 | 50 | 120 | Difference is 20 |

-continued

| A | B | C | Sum | |
|---|---|---|---|---|
| 30 | 40 | 70 | 140 | Difference is 40 |
| 10 | 40 | 50 | 100 | Keep as is |

The third row gets modified as follows: (1) (40-20), 30, 50; (2) 40, (30-20), 50; (3) 50, 30, (50-20). Only (1) and (3) are retained for predictions, since (2) yields a setting below the lower bound of crude B.

The fourth row gets modified as follows: (1) (30-40), 40, 70; (2) 30, (40-40), 70; (3) 30, 40, (70-40). Only (3) is retained for predictions, since (1) and (2) yield settings below the lower bounds.

The described embodiments of the present disclosure are intended to be illustrative rather than restrictive, and are not intended to represent every embodiment of the present disclosure. Various modifications and variations can be made without departing from the spirit or scope of the present disclosure as set forth in the following claims both literally and in equivalents recognized in law.

What is claimed is:

1. A system for assessing and optimizing crude selection comprising:
   a tangible memory;
   a database disposed on the memory storing data comprising crude characteristic data related to a plurality of different crudes or crude blends and crude processing data related to crude processing at a plurality of different operational conditions; and
   a predictive engine having programmable instructions configured for execution by at least one processor,
   wherein the predictive engine is configured to assess similarity of the crude characteristic data and the crude processing data of the plurality of different crudes or crude blends with input crude characteristic data and input crude processing data of the respective crude or crude blend to output statistical best matches with the data stored in the database,
   wherein the predictive engine is configured to execute at least one predictive performance and/or risk assessment model designed to optimize or improve a refining process based on the statistical best matches.

2. The system in accordance with claim 1, wherein the predictive engine takes as input crude information corresponding to at least one crude slate and at least one refinery operating parameter and/or condition and uses desirability metrics to assess similarity of the input to data in the database.

3. The system in accordance with claim 2, wherein the at least one refinery operating parameter and/or condition corresponds to a specific refinery, and wherein the at least one predictive performance or risk assessment model executed by the predictive engine predicts performance or risk measures of refining the at least one crude slate using the specific refinery for running the refining process, probability of problems occurring during the refining process, and distribution of the problems throughout the refining process.

4. The system in accordance with claim 1, wherein the predictive engine accesses treatment options stored within the database suitable for optimizing performance of the refining process.

5. The system in accordance with claim 1, wherein the predictive engine comprises:
   a crude search module which takes as input at least one crude name and/or at least one chemical or other characteristic of the at least one crude identifiable by the at least one crude name and outputs information with respect to at least one crude stored in the database, wherein the at least one crude output by the crude search module corresponds to at least one crude identifiable by the at least one crude name, or corresponds to at least one crude having at least one chemical or other property similar to at least one chemical or other property of the at least one crude identifiable by the at least one crude name;
   an operating parameters/conditions search module which takes as input at least one refinery operating parameter and/or condition and outputs information stored in the database indicating at least one refinery having at least one identical or similar operating parameter and/or condition compared to the at least one refinery operating parameter and/or condition input; and
   a crude slate and chemicals selection module which takes as input the information output by the crude search module and the information output by the operating parameters/conditions search module, and outputs at least one proposed crude slate, chemical treatment and/or performance or risk parameter.

6. The system in accordance with claim 5, wherein the crude slate and chemicals selection module includes a first tier, wherein the first tier identifies at least one crude slate stored in the database which is similar to at least one user-desired crude slate by scoring each crude slate component of the at least one user-desired crude slate based on how well the crude slate component satisfies user criteria, and combines all individual scores of the at least one user-desired crude slate to provide a composite crude slate score; wherein the first tier further scores each individual operating parameter and/or condition based on how well the individual operating parameter and/or condition satisfies the user criteria for that operating parameter and/or condition and outputs an operational score, and then combines all individual operational scores to provide a composite operational score; and wherein the first tier further determines a highest total overall score by combining the composite crude slate and composite operational scores.

7. The system in accordance with claim 6, wherein the crude slate and chemicals selection module further includes a second tier, wherein the second tier includes as an input at least information derived by the first tier and obtains predicted response parameters of interest for selected crude slates, operational parameters and/or conditions, and/or chemical treatments using the at least one predictive performance model.

8. The system in accordance with claim 1, wherein the predictive engine executes at least one optimization algorithm for the refining process.

9. The system in accordance with claim 8, wherein the at least one predictive performance model and/or the at least one risk assessment model is a type of model selected from the group consisting of linear regression models; logistic regression models; non-linear regression models; classification and regression trees and extensions thereof; multiple additive regression splines and extensions thereof; partial least squares regression models; generalized additive models; neural networks and extensions thereof, such as projection pursuit regression; simulation models; expert system-based models, such as Bayesian Belief Networks; theoretical calculation models; engineering economic models; financial risk models; decision analytic models; and engineering process models based on chemistry, physics and engineering principles, such as reaction kinetics and thermodynamics, mass transfer, energy transfer, separation processes, and fluid dynamics.

10. A method for assessing and optimizing crude selection comprising the steps of:
   accessing a database for obtaining data comprising crude characteristic data related to a plurality of different stored crudes or crude blends and crude processing data related to crude processing at a plurality of different operational conditions;
   assessing similarity of the crude characteristic data and the crude processing data of the plurality of different crudes or crude blends with input crude characteristic data and input crude processing data of the respective crude or crude blend to output statistical best matches with the data stored in the database; and
   executing at least one predictive performance and/or risk assessment model to optimize or improve a refining process for at least one crude or crude blend based on the statistical best matches.

11. The method in accordance with claim 10, further comprising the steps of:
   taking as input crude information corresponding to the at least one crude or crude blend and at least one refinery operating parameter and/or condition; and
   using desirability metrics to assess similarity of the input to data in the database, including the at least one stored crude or crude blend.

12. The method in accordance with claim 11, wherein the at least one refinery operating parameter and/or condition corresponds to a specific refinery, and wherein the at least one predictive performance or risk assessment model predicts performance or risk measures of refining the at least one crude or crude blend using the specific refinery for running the refining process, probability of problems occurring during the refining process, and distribution of the problems throughout the refining process.

13. The method in accordance with claim 10, further comprising the step of accessing treatment options stored within the database suitable for improving or optimizing performance of the refining process.

14. The method in accordance with claim 10, further comprising the step of executing at least one optimization algorithm for the refining process.

15. The method in accordance with claim 14, wherein the at least one predictive performance model and/or the at least one risk assessment model is a type of model selected from the group consisting of linear regression models; logistic regression models; non-linear regression models; classification and regression trees and extensions thereof; multiple additive regression splines and extensions thereof; partial least squares regression models; generalized additive models; neural networks and extensions thereof, such as projection pursuit regression; simulation models; expert system-based models, such as Bayesian Belief Networks; theoretical calculation models; engineering economic models; financial risk models; decision analytic models; and engineering process models based on chemistry, physics and engineering principles, such as reaction kinetics and thermodynamics, mass transfer, energy transfer, separation processes, and fluid dynamics.

16. A non-transitory computer readable medium storing a set of instructions configured for execution by at least one processor for performing the steps of:
   accessing a database for obtaining data comprising crude characteristic data related to a plurality of different stored crudes or crude blends and crude processing data related to crude processing at a plurality of different operational conditions;
   assessing similarity of the crude characteristic data and the crude processing data of the plurality of different crudes or crude blends with input crude characteristic data and input crude processing data of the respective crude or crude blend to output statistical best matches with the data stored in the database; and
   executing at least one predictive performance and/or risk assessment model to optimize or improve a refining process for at least one crude or crude blend based on the statistical best matches.

17. The computer readable medium in accordance with claim 16, further performing the steps of:
   taking as input crude information corresponding to the at least one crude or crude blend and at least one refinery operating parameter and/or condition; and
   using desirability metrics to assess similarity of the input to data in the database, including the at least one stored crude or crude blend.

18. The computer readable medium in accordance with claim 17, wherein the at least one refinery operating parameter and/or condition corresponds to a specific refinery, and wherein the at least one predictive performance and/or risk assessment model predicts performance or risk measures of refining the at least one crude or crude blend using the specific refinery for running the refining process, probability of problems occurring during the refining process, and distribution of the problems throughout the refining process.

19. The computer readable medium in accordance with claim 16, further performing the step of accessing treatment options stored within the database suitable for optimizing performance of the refining process.

20. The computer readable medium in accordance with claim 16, further performing the step of executing at least one optimization algorithm for the refining process.

21. The computer readable medium in accordance with claim 20, wherein the at least one predictive performance model and/or the at least one risk assessment model is a type of model selected from the group consisting of linear regression models; logistic regression models; non-linear regression models; classification and regression trees and extensions thereof; multiple additive regression splines and extensions thereof; partial least squares regression models; generalized additive models; neural networks and extensions thereof, such as projection pursuit regression; simulation models; expert system-based models, such as Bayesian Belief Networks; theoretical calculation models; engineering economic models; financial risk models; decision analytic models; and engineering process models based on chemistry, physics and engineering principles, such as reaction kinetics and thermodynamics, mass transfer, energy transfer, separation processes, and fluid dynamics.

22. A system comprising:
   a crude analyzer configured to compare a selected crude type and a selected refinery parameter with historical data comprising crude data related to a plurality of crude types and refinery data related to a plurality of refineries, wherein the crude analyzer is configured to identify one or more crude types and one or more refinery parameters in the historical data that are statistically similar to the selected crude type and the selected refinery parameter, respectively; and
   a refinery optimizer configured to improve a refining process for the selected crude type and the selected refinery parameter based on the one or more crude types and the one or more refinery parameters identified by the crude analyzer,
wherein the crude analyzer and the refinery optimizer are configured to execute on a processor.

23. The system of claim 22, wherein the refinery optimizer is configured to evaluate a plurality of treatment options.

24. A method, comprising:
comparing a selected crude type and a selected refinery parameter with historical data comprising crude data related to a plurality of crude types and refinery data related to a plurality of refineries, wherein comparing a selected crude type and a selected refinery parameter comprises identifying one or more crude types and one or more refinery parameters in the historical data that are statistically similar to the selected crude type and the selected refinery parameter, respectively; and
improving a refining process for the selected crude type and the selected refinery parameter based on the one or more crude types and the one or more refinery parameters identified in the comparing step.

25. The method of claim 24, wherein improving comprises evaluating a plurality of treatment options.

26. The system of claim 22, wherein the refinery optimizer is further configured to improve the refining process by optimizing performance of the refining process using information relating to a similar or identical crude slate and an associated chemical treatment, performance parameter, or risk parameter, or a combination thereof, based on the statistical similarity of the selected crude type and the selected refinery parameter with the one or more crude types and the one or more refinery parameters.

27. The method of claim 24, wherein improving comprises optimizing performance of the refining process using information relating to a similar or identical crude slate and an associated chemical treatment, performance parameter, or risk parameter, or a combination thereof, based on the statistical similarity of the selected crude type and the selected refinery parameter with the one or more crude types and the one or more refinery parameters.

* * * * *